UNITED STATES PATENT OFFICE.

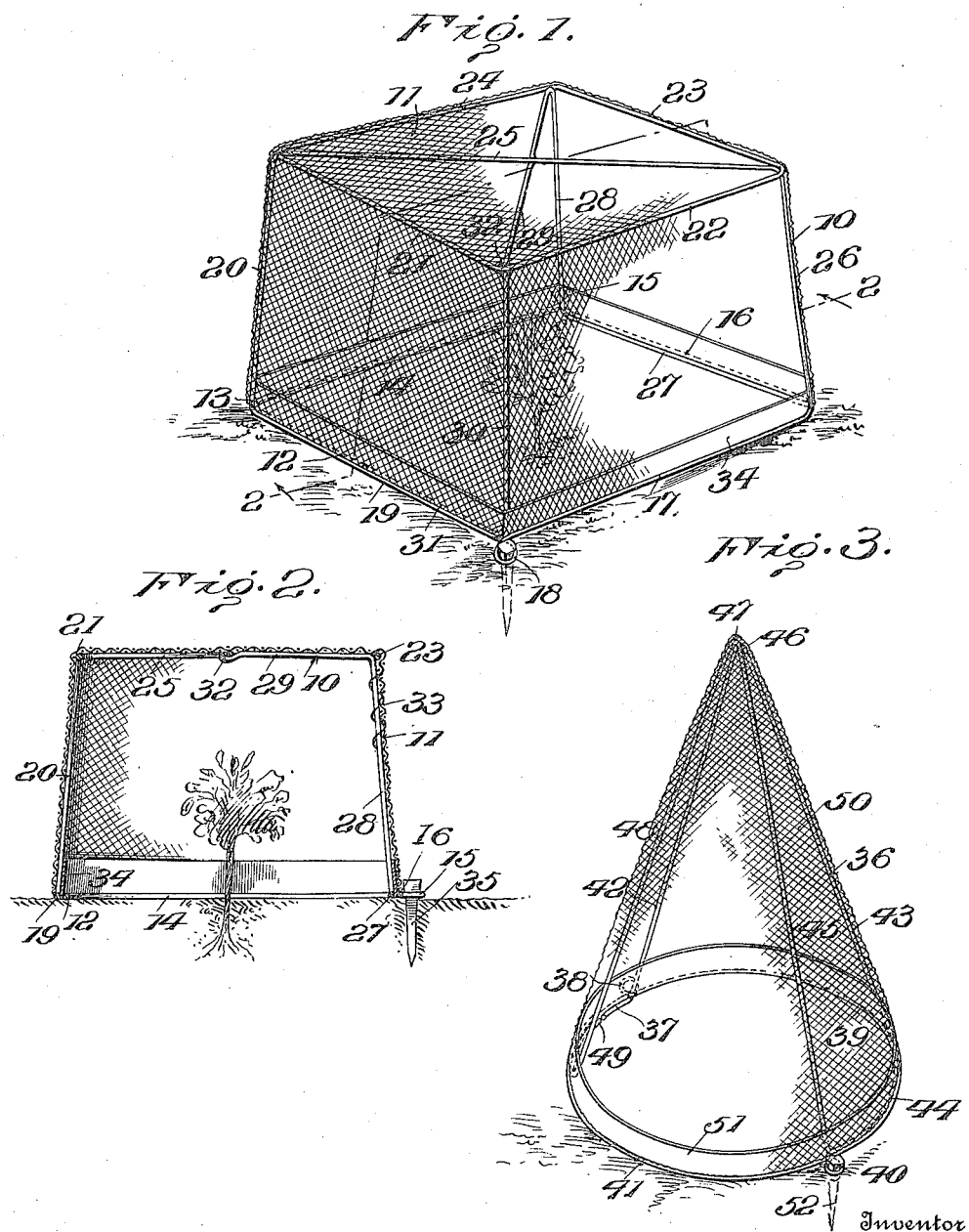

WILLIAM H. DENKER, OF SAN JOSE, CALIFORNIA.

PLANT-PROTECTOR.

1,161,379.   Specification of Letters Patent.   Patented Nov. 23, 1915.

Application filed September 15, 1914. Serial No. 861,842.

*To all whom it may concern:*

Be it known that I, WILLIAM H. DENKER, citizen of the United States, residing at San Jose, in the county of Santa Clara and State of California, have invented certain new and useful Improvements in Plant-Protectors, of which the following is a specification.

My invention relates to new and useful improvements in plant protectors, the primary object of my invention being the provision of a protective housing of foraminous or other suitable material supported by a light framework and capable of being positioned about a plant to keep away slugs, insects and rodents. Furthermore, the protector, if covered with cloth or paper, may be employed to protect the plants from the direct rays of the sun or at night from frost.

More specifically, one of the chief objects of my present invention consists in the construction of the supporting frame of the housing in a simple and economical manner and in such shape and proportions that one housing may be nested within another when not in use to occupy as little space as possible.

A further object of my invention consists in the provision of a simple and efficient means for preventing displacement of the housings in use.

With these and other objects in view, my invention will be more fully described, illustrated in the accompanying drawing, and then specifically pointed out in the claims which are attached to and form a part of this application.

In the drawing: Figure 1 is a perspective view of the preferred form of my invention; Fig. 2 is a central, vertical sectional view taken on the line 2—2 of Fig. 1; Fig. 3 is a perspective view of a somewhat modified form of housing construction.

Corresponding and like parts are referred to in the following description and indicated in all the views of the drawing by the same reference characters.

As previously stated, my invention consists primarily of a framework, indicated as a whole by the numeral 10, which supports a covering 11 of any suitable material, preferably wire netting. The framework 10 is preferably formed from a single length of relatively stiff, although light, resilient wire bent, as will be more fully explained, to provide substantially rectangular spaced bottom and top frames supported in proper relation to each other by substantially vertical corner braces, the top being further braced or strengthened by diagonally extending brace portions. This length of wire forming the frame is bent adjacent its end 12, as shown at 13 to extend for a considerable distance at right angles to the portion 12 as shown at 14, being then bent upon itself to form an eye 15 lying in the plane of the portions 12 and 14, then bent at right angles to the portion 14 and in parallel spaced relation to the portion 12 to form one side portion 16 of the base, this side portion being of greater extent than the portion 12, then bent to form another side portion 17 parallel to the portion 14 and of equal extent, then bent to form a second eye 18 diagonally disposed with respect to the eye 15 and then extended to bear against the portion 12 as far as the curved part 13 joining the portions 12 and 14, this latter part being indicated at 19. The wire beyond the portion 19 at the curve 13 is bent upwardly to form a corner brace portion 20 and then bent to form top side members 21, 22, 23 and 24 corresponding to the portions 19, 17, 16 and 14, respectively, of the bottom or base, this resulting in the provision of parallel spaced top and bottom frame members.

From the free end of the top side portion 24, the wire is extended diagonally across the top frame as shown at 25 to form a diagonal brace for the top frame, then downwardly as shown at 26 to the juncture of the bottom side portions 16 and 17 along the inner side of the bottom side portion 16 as shown at 27 to the eye 15, then upwardly as shown at 28 to the juncture of the top side portions 23 and 24, then diagonally across the top frame member as shown at 29 to the juncture of the portions 21 and 22, then downwardly as shown at 30 to the eye 18 and then extended in parallel engagement with the portion 19 as shown at 31 until its free end abuts against the free end portion 12.

It will thus be seen that I provide a frame substantially parallelepiped in shape having parallel top and bottom portions connected at their corners by substantial corner braces, the top portion or frame being also reinforced by diagonally extending brace members. It should, however, be noted that the corner portions 20, 26, 28 and 30 all incline toward each other somewhat from their lower to their upper ends, whereby the top of the frame as a whole is somewhat smaller than the bottom. Because of this, the finished housings may be readily nested one within the other when not in use. It should further be noted that the edge portions 26, 28 and 30, at their upper ends where they bear against the side portions of the top frame, are inbent somewhat to form retaining seats 32 to receive and support said top frame. The mutual engaging portions of this frame may be secured together by lashings of wire, twine or other suitable material or by clamps if deemed necessary but such securing is hardly thought to be necessary as the foraminous covering 11, when properly applied and secured about the frame, serves to fully brace and stiffen the frame, while at the same time the frame serves to effectually maintain the covering in proper extended position. As this foraminous covering may be attached to the frame members in an infinite number of ways, I have not deemed it necessary, in the present instance, to disclose enlarged views showing various methods of attachment. In practice, however, I shall probably secure this covering by means of wires or cords 33 passed about the various frame members and threaded through the netting, in the manner shown in the drawing.

The frame, which is open at the bottom, is preferably reinforced about its base by a strip of sheet metal 34, such as galvanized iron, the metal strip being disposed upon edge as shown and secured in place by inserting certain of its edge portions between the portions 16 and 27 of the frame at one end and the portion 19 and portions 12 and 31 at the other end, as clearly shown in Fig. 2 of the drawing. The strip is so positioned as to rest by its lower end upon the ground when the protective housing is in use and tends to prevent passage of insects or smaller animals beneath the lower edge of the housing. In some instances, it may even extend slightly below the bottom of the housing and be forced a slight distance into the ground.

In use, the above described housing is positioned over a plant, or a number of plants, to be protected, depending upon its size, and anchored in position by means of stakes 35 driven through the diagonally disposed eyes 15 and 18 and into the ground. These two stakes should be sufficient to hold the housing in place under all conditions, but if deemed advisable, the housings may be so constructed as to provide eyes at all four corners of the base, without in the slightest degree departing from the spirit of my invention, the additional eyes being formed in identically the same manner as those already described.

In Fig. 3 I have illustrated a somewhat modified form of construction in which the frame 36 is substantially conical in shape, although formed from a single length of wire in much the same manner as is the frame previously described. In this form of my invention, one end portion of the wire 37, after being curved somewhat, is bent to form an eye 38, after which it is bent into a semicircle 39 and further bent to provide an eye 40 diametrically opposite the eye 38. The wire is then bent as shown at 41 to complete the circular base, extending to the eye 38 and then being directed upwardly as shown at 42 and downwardly as shown at 43 to the portion 39 of the base at a point preferably substantially midway between the eyes 38 and 40. From this point, it is extended, always in close engagement with the base portion 39, as shown at 44, to a point adjacent the eye 40, then upwardly as at 45 and downwardly over the bight portion 46 connecting the portions 42 and 43, as shown at 47, and downwardly as shown at 48 to the base portion 41, preferably at a point substantially diametrically opposite the lower end of the portion 43, being then curved and extended in close engagement with such base portion, as shown at 49 until its free end meets the free end portion 37. Preferably, the bight portion 46 is instruck somewhat to provide a seat for the bight portion 47 in order to stiffen the upright portions of the resultant frame. The frame thus formed is covered, save at its bottom, with netting 50 and its base is reinforced by an annular strip 51 of sheet metal disposed on edge, with certain of its edge portions seating between the portions 37—49 and portion 41 and between the portions 39 and 44. The eyes 38 and 40 are of course adapted to receive stakes 52 corresponding to the stakes 35 when the protective housing is in use. Inasmuch as this latter form of housing is conical in shape, it will be clearly apparent that a number of housings of this form may be readily nested when not in use.

Although I have illustrated and described two greatly similar forms of my invention, in all their details, it will of course be understood that I do not wish to be limited to these specific details as any changes, within the scope of the appended claims may be made at any time without in the slightest degree departing from the spirit of my invention.

Having thus described the invention, what is claimed as new is:

1. A plant protector including a frame formed from a single length of wire bent to provide base and top portions and connecting portions, and a covering of foraminous material about the top and sides of the frame, portions of the wire crossed by other portions being bent to provide seats to receive such other portions.

2. A plant protector including a frame formed from a single length of wire, a foraminous covering about the top and sides of the frame, the wire forming certain portions of the bottom of the frame being doubled, and a strip of sheet metal surrounding the bottom of the frame and held in place by being seated between the doubled portions thereof.

3. A plant protector including a wire frame, the wire forming certain portions of the bottom of the frame being doubled, a strip of sheet metal surrounding the bottom of the frame and seated between the doubled portions thereof and so held in place, and a foraminous covering at the top and sides of the frame.

In testimony whereof I affix my signature in presence of two witnesses.

WILLIAM H. DENKER. [L. S.]

Witnesses:
FRANK TONNER,
J. F. MARTIN.

Copies of this patent may be obtained for five cents each, by addressing the "Commissioner of Patents, Washington, D. C."